(12) United States Patent
Matsunaga et al.

(10) Patent No.: US 11,353,689 B2
(45) Date of Patent: Jun. 7, 2022

(54) LENS SYSTEM, IMAGING APPARATUS, AND MOVING OBJECT

(71) Applicant: SZ DJI TECHNOLOGY CO., LTD., Shenzhen (CN)

(72) Inventors: Shigehiko Matsunaga, Shenzhen (CN); Atsushi Ohata, Shenzhen (CN); Tatsuya Nakatsuji, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 147 days.

(21) Appl. No.: 16/727,531

(22) Filed: Dec. 26, 2019

(65) Prior Publication Data

US 2020/0132973 A1 Apr. 30, 2020

Related U.S. Application Data

(63) Continuation of application No. PCT/CN2018/116460, filed on Nov. 20, 2018.

(30) Foreign Application Priority Data

Nov. 30, 2017 (JP) .............................. JP2017-229928

(51) Int. Cl.
*G02B 15/14* (2006.01)
*G02B 9/12* (2006.01)
*G02B 13/00* (2006.01)

(52) U.S. Cl.
CPC ....... *G02B 15/143103* (2019.08); *G02B 9/12* (2013.01); *G02B 13/006* (2013.01); *G02B 15/1421* (2019.08)

(58) Field of Classification Search
CPC .............. G02B 15/143103; G02B 13/006; G02B 9/12; G02B 15/1431; G02B 15/143101;

(Continued)

(56) References Cited

U.S. PATENT DOCUMENTS 2,177,246 A * 10/1939 Ellis ....................... F16M 11/34
248/188.91
6,130,705 A * 10/2000 Lareau ..................... G01C 3/08
348/144

(Continued)

FOREIGN PATENT DOCUMENTS

CN 1825154 A 8/2006
CN 104391369 A 3/2015

(Continued)

OTHER PUBLICATIONS

The World Intellectual Property Organization (WIPO) International Search Report for PCT/CN2018/116460 Feb. 15, 2019 6 Pages (including translation).

*Primary Examiner* — George G. King
(74) *Attorney, Agent, or Firm* — Anova Law Group, PLLC

(57) ABSTRACT

A lens system is provided. The lens system includes a positive first lens group, an aperture diaphragm, a positive second lens group, and a third lens group, disposed sequentially from a subject side. The first lens group includes at least three positive lenses and at least one negative lens. The second lens group includes four or more lenses including at least one cemented lens. A negative lens with a concave surface toward the subject side is disposed at the subject side. The third lens group includes three or more lenses including at least one positive lens and at least one negative lens. When focusing is moving from an infinity-distance subject to a short-distance subject, the first lens group, the aperture diaphragm, and the second lens group move integrally toward the subject side, while the third lens group is fixed with respect to an image surface.

17 Claims, 13 Drawing Sheets

(58) Field of Classification Search
CPC .... G02B 15/143105; G02B 15/143107; G02B 15/14; G02B 15/15; G02B 15/155; G02B 15/16; G02B 15/163; G02B 15/167; G02B 15/20; G02B 15/1421
USPC .......................................... 359/791, 691–692
See application file for complete search history.

(56) References Cited

U.S. PATENT DOCUMENTS

| | | | | |
|---|---|---|---|---|
| 7,777,974 | B2* | 8/2010 | Yamamoto | G02B 27/646 |
| | | | | 359/791 |
| 2014/0340563 | A1* | 11/2014 | Yamada | G02B 13/06 |
| | | | | 348/345 |
| 2019/0113721 | A1* | 4/2019 | Katayose | G02B 27/0062 |
| 2019/0265439 | A1* | 8/2019 | Mori | G02B 13/18 |
| 2019/0265441 | A1* | 8/2019 | Katayose | G02B 15/177 |

FOREIGN PATENT DOCUMENTS

| | | |
|---|---|---|
| CN | 104412146 A | 3/2015 |
| CN | 104865683 A | 8/2015 |
| CN | 106199933 A | 12/2016 |
| CN | 106842526 A | 6/2017 |
| JP | H03141313 A | 6/1991 |
| JP | 2007171248 A | 7/2007 |
| JP | 2009210748 A | 9/2009 |
| JP | 2011107313 A | 6/2011 |
| JP | 2013161076 A | 8/2013 |
| JP | 2016099552 A | 5/2016 |
| WO | 2014017025 A1 | 1/2014 |

* cited by examiner

LENS SYSTEM, IMAGING APPARATUS, AND MOVING OBJECT

CROSS-REFERENCE TO RELATED APPLICATION

This application is a continuation of International Application No. PCT/CN2018/116460, filed on Nov. 20, 2018, which claims priority to JP Application No. 2017-229928, filed on Nov. 30, 2017, the entire content of which is incorporated herein by reference.

TECHNICAL FIELD

The present disclosure relates to the field of imaging technologies and, more particularly, to a method for indicating information of a lens system, an imaging apparatus, and a moving object.

BACKGROUND

Patent publication JP 2013-161076 discloses a telephoto lens with a small F value. Patent publication JP 2011-107313 discloses a small optical system. For a lens system that requires images with a larger size, there is a need to reduce F value for reducing an overall length of the lens.

SUMMARY

One aspect of the present disclosure provides a lens system. The lens system includes a first lens group being a positive lens group, an aperture diaphragm, a second lens group being a positive lens group, and a third lens group, disposed sequentially from a subject side. The first lens group includes four or more lenses including at least three positive lenses and at least one negative lens. The second lens group includes four or more lenses including at least one cemented lens, wherein a negative lens with a concave surface toward the subject side is disposed at the subject side. The third lens group includes three or more lenses including at least one positive lens and at least one negative lens. When focusing is moving from an infinity-distance subject to a short-distance subject, the first lens group, the aperture diaphragm, and the second lens group move integrally toward the subject side, while the third lens group is fixed with respect to an image surface. For a focal length f1 of the first lens group, a focal length f2 of the second lens group, an exit pupil distance Dex of the lens system when focusing on an infinity-distance subject, and a radius Y of an effective image ring of the lens system when focusing on an infinity-distance subject, $1.1<f1/f2<1.85$ and $-0.65<Y/Dex<-0.33$.

Another aspect of the present disclosure provides an imaging apparatus. The imaging apparatus includes a lens system and an imaging component. The lens system includes a first lens group being a positive lens group, an aperture diaphragm, a second lens group being a positive lens group, and a third lens group, disposed sequentially from a subject side. The first lens group includes four or more lenses including at least three positive lenses and at least one negative lens. The second lens group includes four or more lenses including at least one cemented lens, wherein a negative lens with a concave surface toward the subject side is disposed at the subject side. The third lens group includes three or more lenses including at least one positive lens and at least one negative lens. When focusing is moving from an infinity-distance subject to a short-distance subject, the first lens group, the aperture diaphragm, and the second lens group move integrally toward the subject side, while the third lens group is fixed with respect to an image surface. For a focal length f1 of the first lens group, a focal length f2 of the second lens group, an exit pupil distance Dex of the lens system when focusing on an infinity-distance subject, and a radius Y of an effective image ring of the lens system when focusing on an infinity-distance subject, $1.1<f1/f2<1.85$ and $-0.65<Y/Dex<-0.33$.

Another aspect of the present disclosure provides a moving object that is movable. The moving object includes a lens system. The lens system includes a first lens group being a positive lens group, an aperture diaphragm, a second lens group being a positive lens group, and a third lens group, disposed sequentially from a subject side. The first lens group includes four or more lenses including at least three positive lenses and at least one negative lens. The second lens group includes four or more lenses including at least one cemented lens, wherein a negative lens with a concave surface toward the subject side is disposed at the subject side. The third lens group includes three or more lenses including at least one positive lens and at least one negative lens. When focusing is moving from an infinity-distance subject to a short-distance subject, the first lens group, the aperture diaphragm, and the second lens group move integrally toward the subject side, while the third lens group is fixed with respect to an image surface. For a focal length f1 of the first lens group, a focal length f2 of the second lens group, an exit pupil distance Dex of the lens system when focusing on an infinity-distance subject, and a radius Y of an effective image ring of the lens system when focusing on an infinity-distance subject, $1.1<f1/f2<1.85$ and $-0.65<Y/Dex<-0.33$ In the present disclosure, a lens system with a large image size, a small F value, and a small overall length of the lens system may be achieved.

Other aspects or embodiments of the present disclosure can be understood by those skilled in the art in light of the description, the claims, and the drawings of the present disclosure.

DETAILED DESCRIPTION

Figure 1:
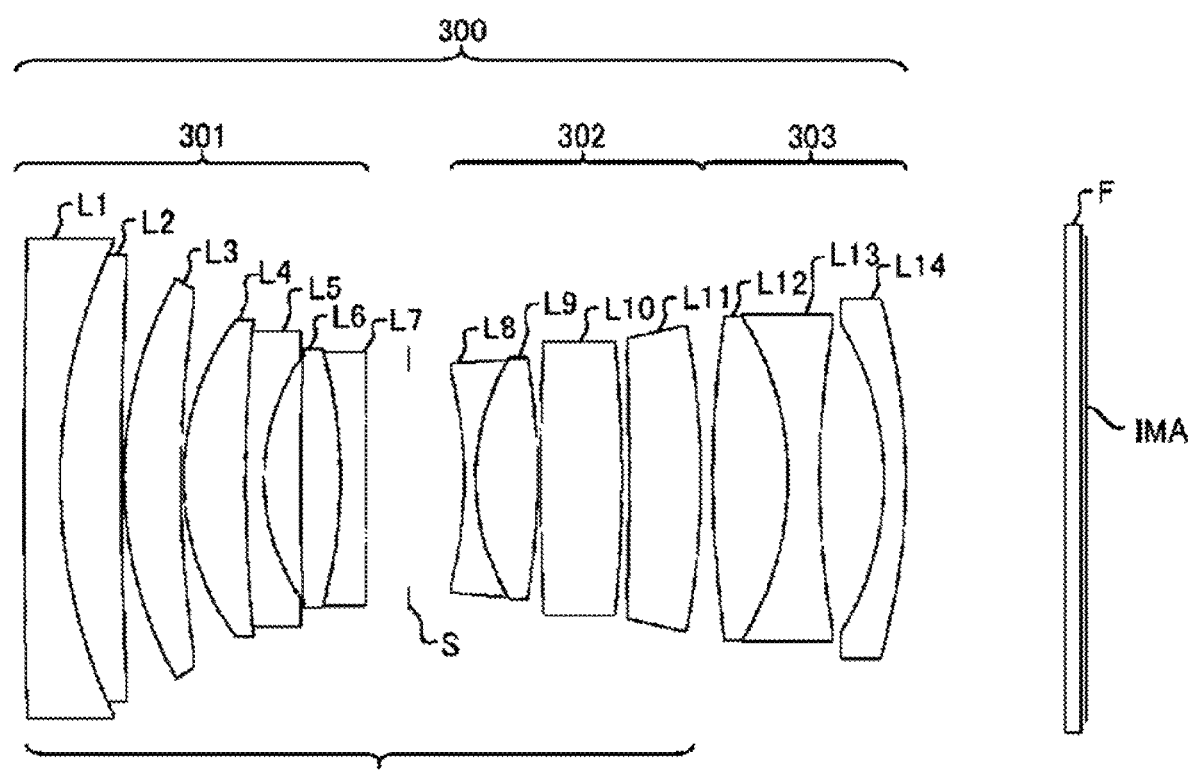
FIG. 1 illustrates a lens structure, a filter and an imaging device in an exemplary lens system consistent with various embodiment of the present disclosure.

Reference will now be made in detail to exemplary embodiments of the disclosure, which are illustrated in the accompanying drawings. Wherever possible, the same reference numbers will be used throughout the drawings to refer to the same or like parts.

Example embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

The present disclosure provides a front-focus-type lens system. The front-focus-type lens system may focus by moving a first lens group, an aperture diaphragm, and a second lens group as a whole. In comparison with other focusing type lens systems, the front-focusing lens system may facilitate miniaturization of an overall length and a diameter of a front lens, and also may suppress aberration fluctuations caused by focusing. An optical system with a small F value may be provided through a lens system provided by various embodiments of the present disclosure.

FIG. 1, FIG. 3, FIG. 5, FIG. 7, and FIG. 9 show exemplary lens systems provided by various embodiments of the present disclosure. From a subject side, the lens system may include a positive first lens group, an aperture diaphragm, a positive second lens group, and a third lens group sequentially. The first lens group may include four or more lenses comprising at least three positive lenses and at least one negative lens. The second lens group may include four or more lenses comprising at least one cemented lens, and a negative lens having a concave surface facing the subject side may be disposed on the subject side. The third lens group may include three or more lenses comprising at least one positive lens and at least one negative lens. In the lens system, when focusing from an infinity-distance subject to a close subject, the first lens group, the aperture diaphragm, and the second lens group may move toward the subject side as a whole, and the third lens group may be fixed relative to an image surface.

A focal length of the first lens group may be f1, a focal length of the second lens group may be f2, and an exit pupil distance of the lens system when focusing on an infinity-distance subject may be Dex. An effective image ring of the lens system when focusing on an infinity-distance subject may have a radius Y. The following conditions may be satisfied:

$$1.1 < f1/f2 < 1.85; \tag{1}$$

$$-0.65 < Y/Dex < -0.33. \tag{2}$$

The exit pupil distance may be a distance from the image surface to the exit pupil. The effective image ring may be a diameter of an image ring that may guarantee optical performance. The effective image ring may be a circle covering a diagonal length of a sensor in the system, and may at least ensure that the amount of peripheral light at diagonal positions of the sensor reaches more than 20%.

The condition expression (1) may specify a refractive power of the first lens group and the second lens group. When an upper limit of the condition expression (1) is exceeded, the refractive power of the second lens group may be relatively strong and it may be difficult to correct off-axis aberrations. When a lower limit of the condition expression (1) is exceeded, the refractive power of the second lens group may be relatively weak, resulting in an increase in the size of the lens system.

The first lens group and the second lens group satisfying the condition $$1.25 < f1/f2 < 1.6 \tag{1-1}$$

may make the above effect more significant.

The condition expression (2) may specify a relationship between the position of the exit pupil when the lens system focuses on the infinity-distance subject and the radius of the effective image circle. When an upper limit of the condition expression (2) is exceeded, the position of the exit pupil may be far away from the image surface, and it may be difficult to reduce the overall length. When a lower limit of the condition expression (2) is exceeded, the position of the exit pupil may be too close to the image surface relative to the radius of the effective image circle, correspondingly an incident angle of off-axis light may become large and off-axis aberrations may occur easily. Further, since an incident angle limit of an imaging device may be exceeded, an amount of light in the surrounding area may be reduced.

The lens system satisfying the condition $$-0.58 < Y/Dex < -0.4 \tag{2-1}$$

may make the above effect more significant.

In the present disclosure, the lens system may efficiently share the correction of on-axis aberration and off-axis aberration on each surface of the lens in the lens system and may have a small F value.

In one embodiment, a maximum height of the image may be used as Y in the above discussion.

A curvature radius of a surface of the second lens group closest to the subject side may be R2f, and a focal length of the entire lens system may be f. It is preferable to use R2f and f satisfying the condition $$-0.95 < R2f/f < -0.38 \quad (3).$$

The condition expression (3) may specify a relationship between the curvature radius of the surface of the second lens group closest to the subject side and the focal length of the entire lens system. When an upper limit of the condition expression (3) is exceeded, it may be difficult to correct off-axis aberrations. When a lower limit of the condition expression (3) is exceeded, spherical aberrations may occur easily, and on-axis performance when eccentric may be degraded.

The lens system satisfying the condition $$-0.85 < R2f/f < -0.45 \quad (3\text{-}1)$$

may make the above effect more significantly.

A focal length of the third lens group may be f3, and may be preferable to satisfy the condition $$4.0 < |f3/f| \quad (4).$$

The condition expression (4) may specify a relationship between the focal length of the third lens group and the focal length of the entire lens system. When the lower limit of the condition expression (4) is exceeded, a refractive power of the third lens group may be too strong, a structure of the roughly symmetrical system may collapse, making it difficult to correct aberrations. It may be also difficult to suppress aberration fluctuations because of the subject distance.

A combined focal length of the first lens group and the second lens group may be f12, and may be preferable to satisfy the following condition $$0.85 < f12/f < 1.2 \quad (5).$$

The condition expression (5) may specify a relationship between the focal length of the entire lens system and the combined focal length of the mobile group (including the first lens group and the second lens group). If an upper limit of the condition expression (5) is exceeded, a refractive power of the mobile group is too weak, and a moving distance when focusing from an infinity-distance subject to a short-distance subject may become too long, inducing an increase of the overall length. If a lower limit of the condition expression (5) is exceeded, the refractive power of the mobile group may be too strong, and it may be difficult to perform aberration correction.

The system satisfying $$0.95 < f12/f < 1.15 \quad (5\text{-}1)$$

may make the above effect more significant.

A curvature radius of a surface of the first lens group closest to the image side may be R1r, and may be preferable to satisfy the following condition $$R1r/f < -0.3 \quad (6).$$

The condition expression (6) may specify a relationship between the focal length of the entire lens system and the curvature radius of the surface of the first lens group closest to the image side. If an upper limit of the condition expression (6) is exceeded, the structure of the roughly symmetrical system may collapse, spherical aberration and off-axis aberration of the corresponding surface may occur significantly, making it difficult to correct aberrations. An off-axis performance when eccentric may be degraded significantly.

The system satisfying $$R1r/f < -0.5 \quad (6\text{-}1)$$

may make the above effect more significant.

An Abbe number of a third positive lens from the subject side may be vdp3, and may be preferable to satisfy the following condition $$60 < vdp3 \quad (7).$$

The condition expression (7) may specify the Abbe number of the third positive lens in the first lens group. When a lower limit of the condition expression (7) is exceeded, on-axis chromatic aberration and magnification chromatic aberration may occur significantly, making it hard to improve the performance.

The system satisfying $$65 < vdp3 \quad (7\text{-}1)$$

may make the above effect more significant.

A certain effect may also be obtained by making the Abbe number of the third positive lens of the first lens group larger than that of the first positive lens of the first lens group and the Abbe number of the second positive lens of the first lens group.

FIG. 1 illustrates a lens structure, a filter F and an imaging device IMA in a lens system 300 provided by an embodiment (Embodiment 1) of the present disclosure. From a subject side, the lens system 300 may include a first lens group 301, an aperture diaphragm S, a second lens group 302, and a third lens group 303, sequentially. The filter F may be disposed at a subject side of the imaging device IMA. The light may be incident on the imaging device IMA through the lens system 300 and the filter F.

In the following descriptions, Ln where n is an integer larger than or equal to 1, is used to label an n-th lens from the subject side in various embodiments. Lenses with a same label Ln may be not a same lens in different embodiments.

A surface number i where i is a natural number may be used to label different surfaces of the lens system. From the subject side, a beginning surface of the lenses may be a first surface, and the surface numbers of the surfaces may be increased sequentially in an order that the light passes through the surfaces afterward. STO represents an aperture surface of the aperture diaphragm S. Di represents a distance between an i-th surface and a (i+1)-st surface on the optical axis.

"f" represents a focal length, "Fno" represents the F value, "ω" represents the half field angle. "Y" represents the radius of the effective image ring. "Dex" represents the exit pupil distance. "R" represents curvature radius. In the curvature radius, "INF" represents a plane. "n" represents refractive index. "V" represents the Abbe number. The refractive index n and the Abbe number v are values of the d-line (λ=587.6 nm).

Table 1 illustrates parameters of lenses of the lens system 300 where Di, n, v are listed relative to the surface numbers i.

TABLE 1

| Surface i | R | D | Nd | Vd |
|---|---|---|---|---|
| 1 | 1000.000 | 4.200 | 1.73800 | 32.33 |
| 2 | 62.477 | 7.037 | 1.90525 | 35.04 |
| 3 | 463.687 | 0.300 | | |
| 4 | 46.311 | 6.608 | 1.91650 | 31.60 |
| 5 | 136.450 | 0.300 | | |
| 6 | 30.300 | 7.153 | 1.53775 | 74.70 |
| 7 | 180.445 | 2.115 | 1.85026 | 32.27 |
| 8 | 24.027 | 4.273 | | |

TABLE 1-continued

| Surface i | R | D | Nd | Vd |
|---|---|---|---|---|
| 9 | 294.057 | 4.586 | 1.59522 | 67.73 |
| 10 | −55.379 | 3.000 | 1.73800 | 32.33 |
| 11 | −1299.409 | 4.831 | | |
| STO | INF | 6.490 | | |
| 13 | −48.022 | 1.300 | 1.60738 | 56.82 |
| 14 | 26.316 | 7.176 | 1.61800 | 63.33 |
| 15 | −79.516 | 0.300 | | |
| 16 | 279.778 | 9.474 | 1.90525 | 35.04 |
| 17 | −158.893 | 0.825 | | |
| 18 | −594.041 | 8.302 | 1.61800 | 63.33 |
| 19 | −92.672 | 1.193 | | |
| 20 | 130.243 | 8.658 | 1.90525 | |
| 21 | −34.750 | 3.630 | 1.67270 | 32.10 |
| 22 | 100.234 | 7.482 | | |
| 23 | −33.333 | 2.500 | 1.67270 | 32.10 |
| 24 | −74.735 | 18.700 | | |
| 25 | INF | 1.800 | 1.51680 | 64.20 |
| 26 | INF | 0.500 | | |
| 27 | INF | 0.000 | | |

TABLE 2

| f | 79.91 |
|---|---|
| Fno | 2.06 |
| ω | 19.14 |
| Y | 27.5 |
| Dex | −56.69 |

Table 2 illustrates the focal length f of the entire system, Fno, the half field angle ω, the radius of the effective image ring Y, and the exit pupil distance Dex, when the lens system 300 focuses on an infinity-distance subject.

The first lens group 301 may have a positive refractive power. The second lens group 302 may have a positive refractive power. The third lens group 303 may have a negative refractive power. In the lens system 300, the first lens group 301, the aperture diaphragm S, and the second lens group 302 may move as a whole to perform focusing. The arrow in FIG. 1 schematically shows the trajectory of the mobile group when focusing from an infinity-distance subject to a short-distance subject.

The first lens group 301 may include a cemented lens with positive refractive power comprising a negative lens L1 and a positive meniscus lens L2, a positive meniscus lens L3 with a convex face toward the subject side, a cemented lens with negative refractive power comprising a positive lens L4 and a negative lens L5, and a cemented lens with positive refractive power comprising a positive lens L6 and a negative lens L7. With this configuration, the spherical aberration and off-axis aberration can be effectively corrected in the lens system 300 having a small F-number. In addition, by using a glass material with a large Abbe number for the third positive lens L4 and the fourth positive lens L6 from the object side, chromatic aberration on the axis and off-axis chromatic aberration can be corrected well.

The second lens group 302 may include a cemented lens with a negative refractive power comprising a negative lens L8 having a biconcave shape and a positive lens L9 having a biconvex shape, a positive lens L10 having a biconvex shape, and a positive lens L11 having a convex image side surface. By sharing the refractive power required for the second lens group 302 with at least four lenses, the on-axis aberration, and off-axis aberration can be corrected in a balanced manner.

The third lens group 303 may include a cemented lens L12 with a positive refractive power comprising a positive lens L12 with a biconvex shape and a negative lens L13 with a biconcave shape, and a negative meniscus lens L14 having a convex image side surface.

Figure 2:
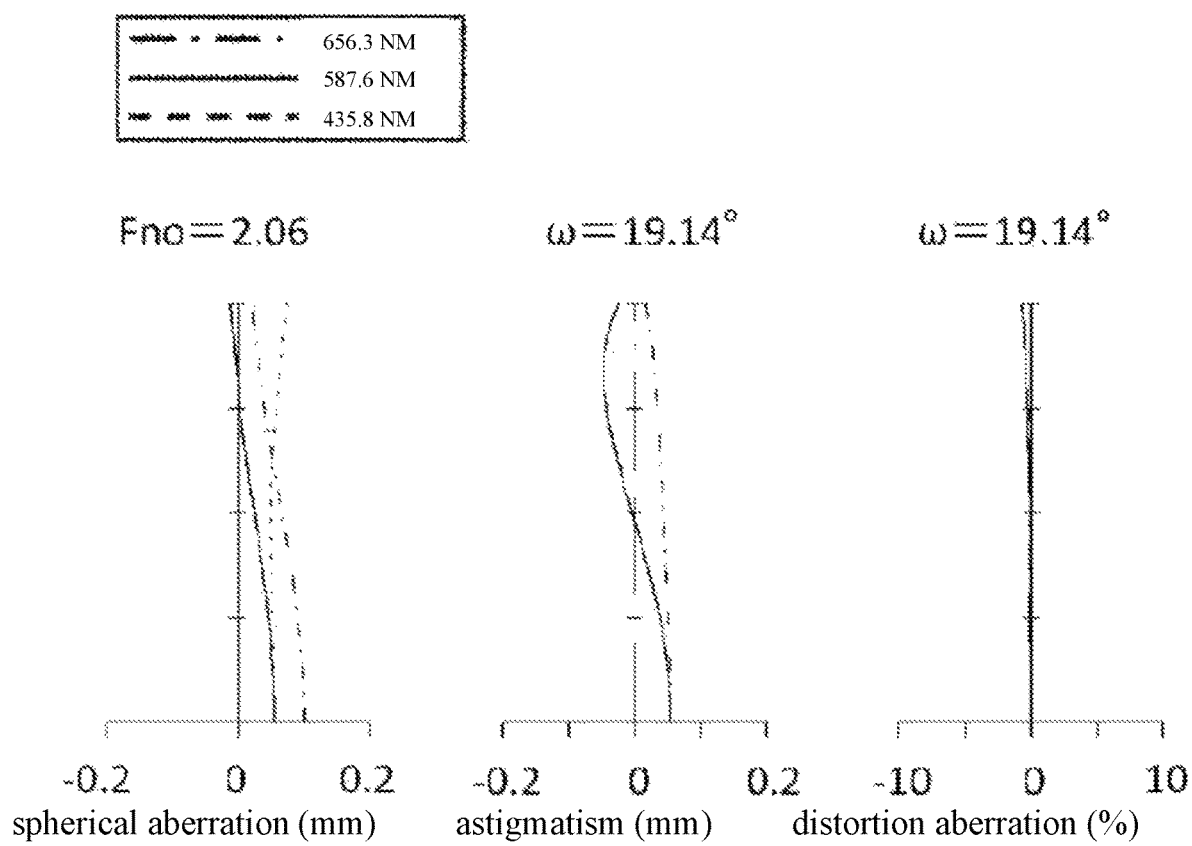
FIG. 2 illustrates a spherical aberration, astigmatism, and distortion aberration of the lens system in FIG. 1 focusing on an infinity-distance subject consistent with various embodiment of the present disclosure.

FIG. 2 shows spherical aberration, astigmatism, and distortion aberration of the lens system 300 in a state of focusing on an infinity-distance subject. In spherical aberration, the one-dot chain line indicates the value of the C-line (656.27 nm), the solid line indicates the value of the d-line (587.56 nm), and the dashed line indicates the value of the g-line (435.84 nm). In astigmatism, a solid line represents the value of the sagittal image plane of the d-line, and a dashed line represents the value of the meridional image plane of the d-line. The distortion aberration indicates the value of the d-line. As can be seen from the aberration diagrams, the lens system 300 may have a good correction of each aberration and excellent imaging performance.

Figure 3:
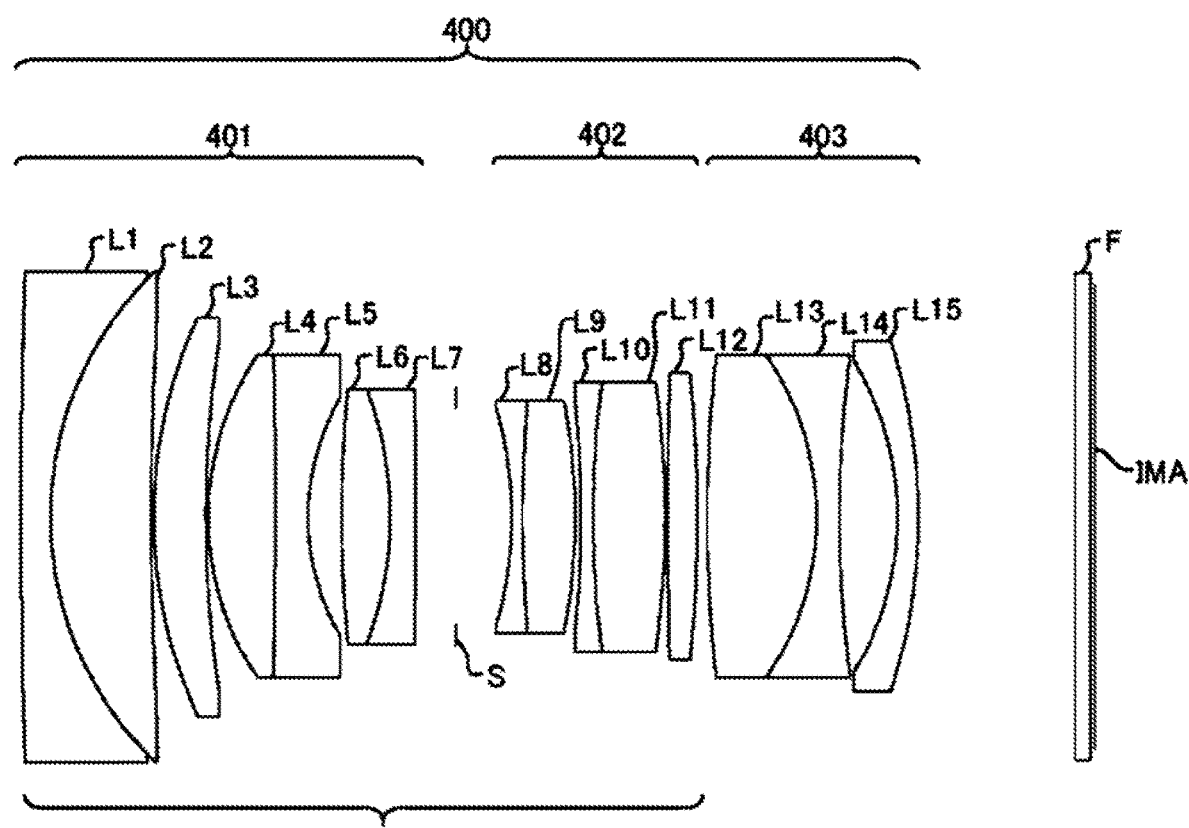
FIG. 3 illustrates a lens structure, a filter and an imaging device in another exemplary lens system consistent with various embodiment of the present disclosure.

FIG. 3 illustrates another exemplary lens system 400, a filter F and an imaging device IMA provided by another embodiment (Embodiment 2) of the present disclosure. From a subject side, the lens system 400 may include a first lens group 401, an aperture diaphragm S, a second lens group 402, and a third lens group 403, sequentially. The filter F may be disposed at a subject side of the imaging device IMA.

Table 3 illustrates parameters of lenses of the lens system 400, where Di, n, v are listed relative to the surface numbers i.

Table 4 illustrates the focal length f of the entire system, Fno, the half field angle ω, the radius of the effective image ring Y, and the exit pupil distance Dex, when the lens system 400 focuses on an infinity-distance subject.

TABLE 3

| Surface i | R | D | Nd | Vd |
|---|---|---|---|---|
| 1 | 1000.000 | 3.500 | 1.73800 | 32.33 |
| 2 | 40.384 | 12.000 | 1.91650 | 31.60 |
| 3 | 409.202 | 0.300 | | |
| 4 | 56.277 | 6.189 | 1.90525 | 35.04 |
| 5 | 139.699 | 0.300 | | |
| 6 | 34.463 | 7.958 | 1.53775 | 74.70 |
| 7 | −1013.557 | 4.000 | 1.85025 | 32.27 |
| 8 | 28.000 | 4.002 | | |
| 9 | 149.479 | 5.783 | 1.53775 | 74.70 |
| 10 | −42.250 | 3.000 | 1.63930 | 44.87 |
| 11 | −1000.000 | 4.806 | | |
| STO | INF | 6.668 | | |
| 13 | −45.455 | 1.300 | 1.51742 | 52.43 |
| 14 | 165.540 | 6.244 | 1.72915 | 54.68 |
| 15 | −70.579 | 0.719 | | |
| 16 | −127.007 | 1.500 | 1.59270 | 35.31 |
| 17 | 125.479 | 8.500 | 1.90525 | 35.04 |
| 18 | −111.160 | 0.300 | | |
| 19 | 656.158 | 3.530 | 1.49700 | 81.54 |
| 20 | −164.512 | 1.192 | | |
| 21 | 175.029 | 13.000 | 1.90525 | 35.04 |
| 22 | −33.684 | 2.728 | 1.67270 | 32.10 |
| 23 | 143.905 | 6.974 | | |
| 24 | −35.325 | 2.500 | 1.69895 | 30.13 |
| 25 | −67.5258 | 18.700 | | |
| 26 | INF | 1.800 | 1.51680 | 64.20 |
| 27 | INF | 0.500 | | |
| 28 | INF | 0.000 | | |

TABLE 4

| f | 80.04 |
|---|---|
| Fno | 1.95 |
| ω | 19.12 |

TABLE 4-continued

| | |
|---|---|
| Y | 27.5 |
| Dex | −56.82 |

The first lens group 401 may have a positive refractive power. The second lens group 402 may have a positive refractive power. The third lens group 403 may have a negative refractive power. In the lens system 400, the first lens group 401, the aperture diaphragm S, and the second lens group 402 may move as a whole to perform focusing. The arrow in FIG. 3 schematically shows the trajectory of the mobile group when focusing from an infinity-distance subject to a short-distance subject.

The first lens group 401 may include a cemented lens with positive refractive power comprising a negative lens L1 and a positive meniscus lens L2, a positive meniscus lens L3 with a convex face toward the subject side, a cemented lens with negative refractive power comprising a positive lens L4 and a negative lens L5, and a cemented lens with positive refractive power comprising a positive lens L6 and a negative lens L7. With this configuration, the spherical aberration and off-axis aberration can be effectively corrected in the lens system 400 having a small F-number. In addition, by using a glass material with a large Abbe number for the third positive lens L4 and the fourth positive lens L6 from the object side, chromatic aberration on the axis and off-axis chromatic aberration can be corrected well.

The second lens group 402 may include a cemented lens with a positive refractive power comprising a negative lens L8 having a biconcave shape and a positive lens L9 having a biconvex shape, a cemented lens with a positive refractive power comprising a negative lens L10 having a biconcave shape and a positive lens L11 having a biconvex shape, and a positive lens L12 having a biconvex shape. By sharing the refractive power required for the second lens group 402 with at least four lenses, the on-axis aberration, and off-axis aberration can be corrected in a balanced manner.

The third lens group 403 may include a cemented lens with a positive refractive power comprising a positive lens L13 with a biconvex shape and a negative lens L14 with a biconcave shape, and a negative meniscus lens L15 having a convex image side surface.

Figure 4:
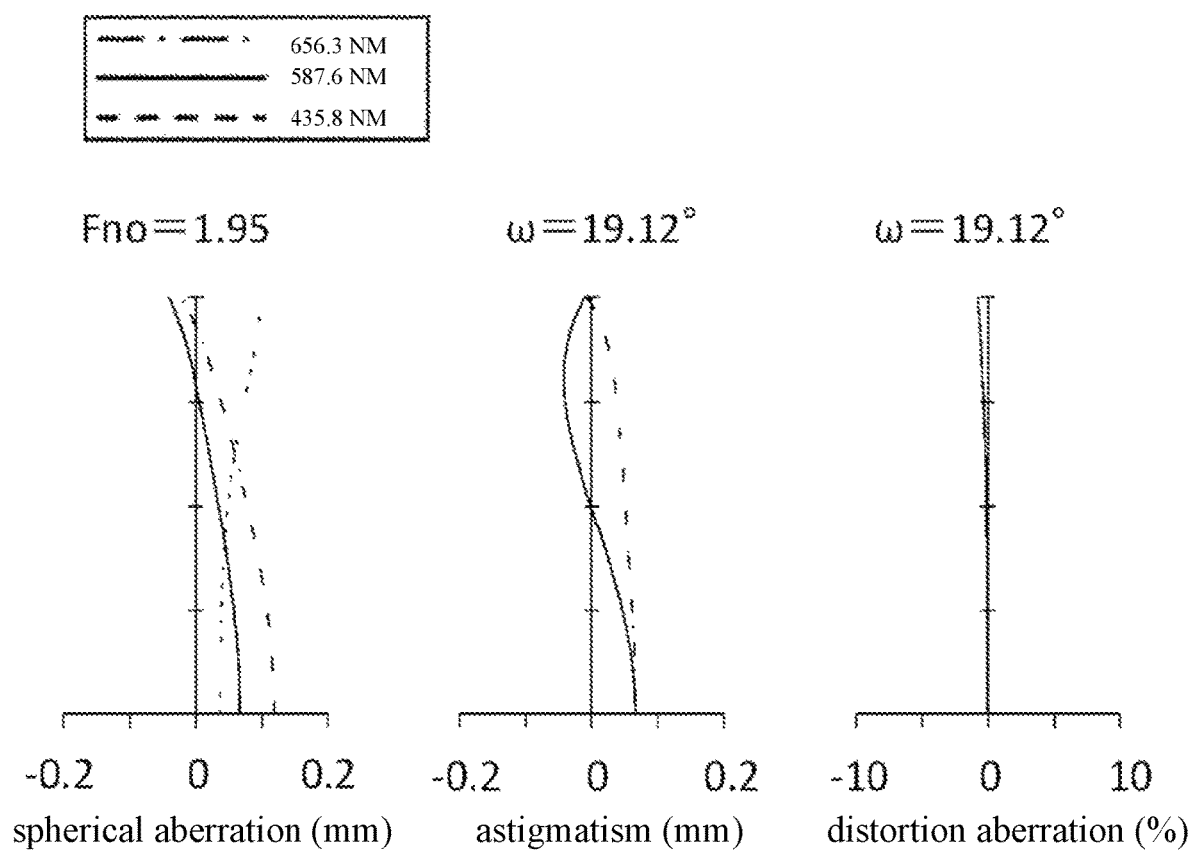
FIG. 4 illustrates a spherical aberration, astigmatism, and distortion aberration of the lens system in FIG. 3 focusing on an infinity-distance subject consistent with various embodiment of the present disclosure.

FIG. 4 shows spherical aberration, astigmatism, and distortion aberration of the lens system 400 in a state of focusing on an infinity-distance subject. In spherical aberration, the one-dot chain line indicates the value of the C-line (656.27 nm), the solid line indicates the value of the d-line (587.56 nm), and the dashed line indicates the value of the g-line (435.84 nm). In astigmatism, a solid line represents the value of the sagittal image plane of the d-line, and a dashed line represents the value of the meridional image plane of the d-line. The distortion aberration indicates the value of the d-line. As can be seen from the aberration diagrams, the lens system 400 may have a good correction of each aberration and excellent imaging performance.

Figure 5:
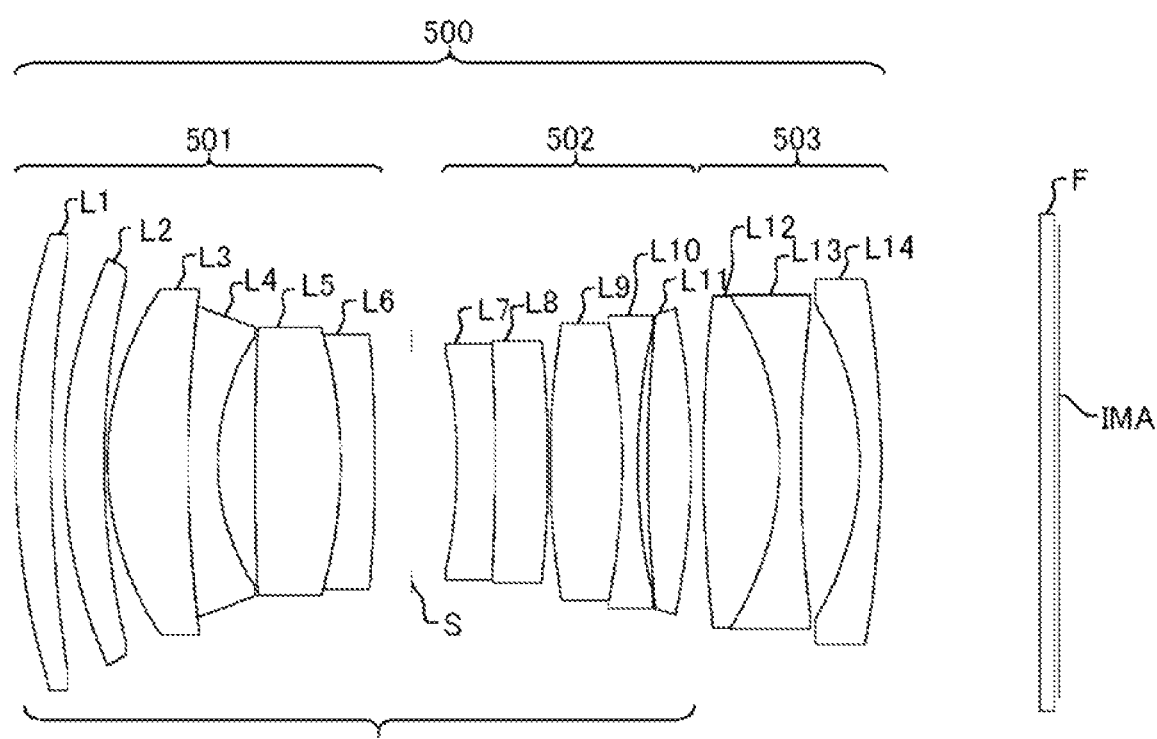
FIG. 5 illustrates a lens structure, a filter and an imaging device in another exemplary lens system consistent with various embodiment of the present disclosure.

FIG. 5 illustrates another exemplary lens system 500, a filter F and an imaging device IMA provided by another embodiment (Embodiment 3) of the present disclosure. From a subject side, the lens system 500 may include a first lens group 501, an aperture diaphragm S, a second lens group 502, and a third lens group 503, sequentially. The filter F may be disposed at a subject side of the imaging device IMA.

Table 5 illustrates parameters of lenses of the lens system 500, where Di, n, v are listed relative to the surface numbers i.

Table 6 illustrates the focal length f of the entire system, Fno, the half field angle ω, the radius of the effective image ring Y, and the exit pupil distance Dex, when the lens system 400 focuses on an infinity-distance subject.

TABLE 5

| Surface i | R | D | Nd | Vd |
|---|---|---|---|---|
| 1 | 90.909 | 4.228 | 1.90525 | 35.04 |
| 2 | 159.685 | 1.500 | | |
| 3 | 58.236 | 4.740 | 1.88300 | 40.76 |
| 4 | 91.729 | 0.400 | | |
| 5 | 35.035 | 9.474 | 1.53775 | 74.70 |
| 6 | 153.107 | 3.500 | 1.73800 | 32.33 |
| 7 | 27.000 | 4.382 | | |
| 8 | 357.143 | 10.134 | 1.53775 | 74.70 |
| 9 | −53.179 | 4.000 | 1.71700 | 47.93 |
| 10 | −164.761 | 4.316 | | |
| STO | INF | 5.365 | | |
| 12 | −61.473 | 4.500 | 1.57270 | 32.10 |
| 13 | −266.872 | 6.172 | 1.85150 | 40.78 |
| 14 | −139.497 | 0.300 | | |
| 15 | 101.230 | 8.500 | 1.88300 | 40.76 |
| 16 | −86.462 | 1.800 | 1.57501 | 41.50 |
| 17 | 70.196 | 1.188 | | |
| 18 | 161.408 | 5.102 | 1.61800 | 63.33 |
| 20 | 173.398 | 8.950 | 1.88300 | 40.76 |
| 21 | −35.391 | 2.502 | 1.62004 | 36.26 |
| 22 | 144.317 | 6.948 | | |
| 23 | −35.000 | 2.500 | 1.54072 | 47.23 |
| 24 | −123.751 | 18.700 | | |
| 25 | INF | 1.800 | 1.51680 | 64.20 |
| 26 | INF | 0.500 | | |
| 27 | INF | 0.000 | | |

TABLE 6

| | |
|---|---|
| f | 80.50 |
| Fno | 1.95 |
| ω | 18.99 |
| Y | 27.5 |
| Dex | −55.49 |

The first lens group 501 may have a positive refractive power. The second lens group 502 may have a positive refractive power. The third lens group 503 may have a negative refractive power. In the lens system 500, the first lens group 501, the aperture diaphragm S, and the second lens group 502 may move as a whole to perform focusing. The arrow in FIG. 5 schematically shows the trajectory of the mobile group when focusing from an infinity-distance subject to a short-distance subject.

The first lens group 501 may include a positive meniscus lens L1 with a convex surface toward the subject side, a positive meniscus lens L2 with a convex face toward the subject side, a cemented lens with a negative refractive power comprising a positive lens L3 and a negative lens L4, a cemented lens with positive refractive power comprising a positive lens L5 and a negative lens L6. With this configuration, the spherical aberration and off-axis aberration can be effectively corrected in the lens system 500 having a small F-number. In addition, by using a glass material with a large Abbe number for the third positive lens L3 and the fourth positive lens L5 from the object side, chromatic aberration on the axis and off-axis chromatic aberration can be corrected well.

The second lens group 502 may include a cemented lens with a negative refractive power comprising a negative lens L7 having a concave subject-side surface and a positive lens L8, a cemented lens with a positive refractive power comprising a positive lens L9 having a biconvex shape and a negative lens L10 having a biconcave shape, and a positive lens L11 having a biconvex shape. By sharing the refractive power required for the second lens group 502 with at least four lenses, the on-axis aberration, and off-axis aberration can be corrected in a balanced manner.

The third lens group 503 may include a cemented lens with a positive refractive power comprising a positive lens L12 with a biconvex shape and a negative lens L13 with a biconcave shape, and a negative meniscus lens L14 having a convex image side surface.

Figure 6:
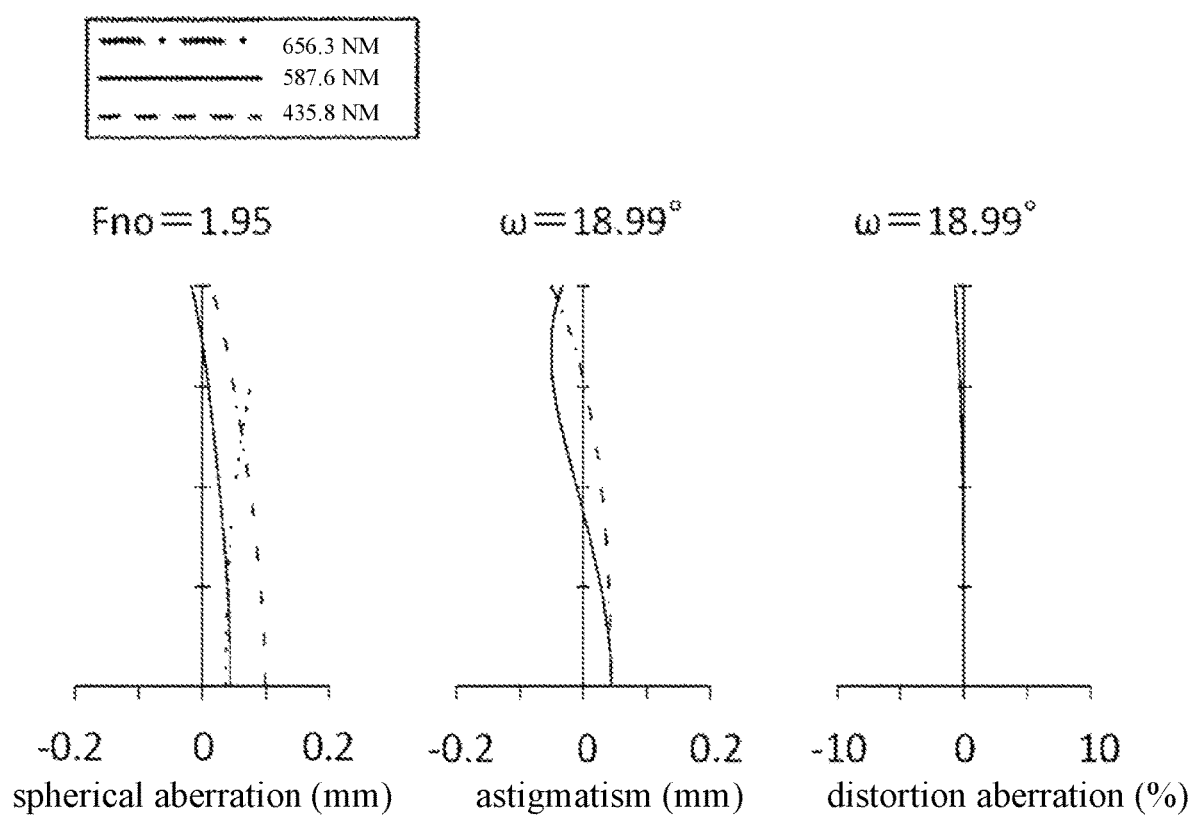
FIG. 6 illustrates a spherical aberration, astigmatism, and distortion aberration of the lens system in FIG. 5 focusing on an infinity-distance subject consistent with various embodiment of the present disclosure.

FIG. 6 shows spherical aberration, astigmatism, and distortion aberration of the lens system 500 in a state of focusing on an infinity-distance subject. In spherical aberration, the one-dot chain line indicates the value of the C-line (656.27 nm), the solid line indicates the value of the d-line (587.56 nm), and the dashed line indicates the value of the g-line (435.84 nm). In astigmatism, a solid line represents the value of the sagittal image plane of the d-line, and a dashed line represents the value of the meridional image plane of the d-line. The distortion aberration indicates the value of the d-line. As can be seen from the aberration diagrams, the lens system 500 may have a good correction of each aberration and excellent imaging performance.

Figure 7:
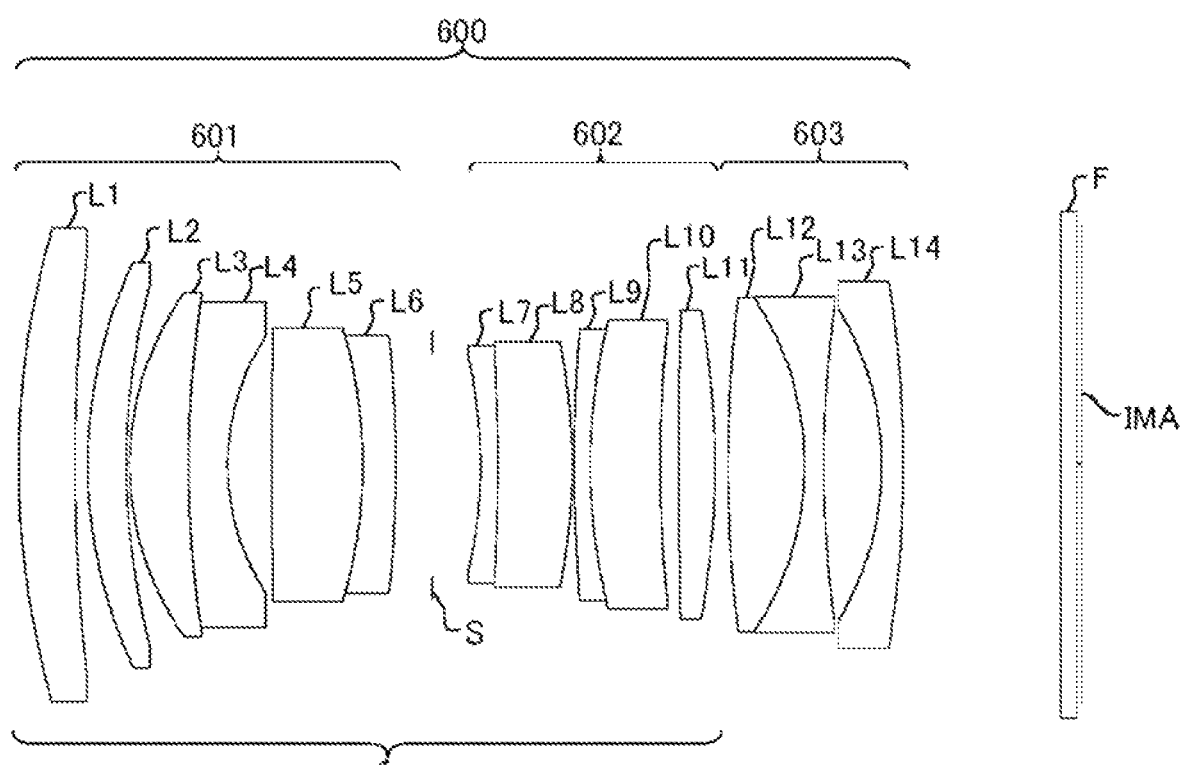
FIG. 7 illustrates a lens structure, a filter and an imaging device in another exemplary lens system consistent with various embodiment of the present disclosure.

FIG. 7 illustrates another exemplary lens system 600, a filter F and an image device IMA provided by another embodiment (Embodiment 4) of the present disclosure. From a subject side, the lens system 600 may include a first lens group 601, an aperture diaphragm S, a second lens group 602, and a third lens group 603, sequentially. The filter F may be disposed at a subject side of the imaging device IMA.

Table 7 illustrates parameters of lenses of the lens system 600, where Di, n, v are listed relative to the surface numbers i.

Table 8 illustrates the focal length f of the entire system, Fno, the half field angle ω, the radius of the effective image ring Y, and the exit pupil distance Dex, when the lens system 600 focuses on an infinity-distance subject.

TABLE 7

| Surface i | R | D | Nd | Vd |
| --- | --- | --- | --- | --- |
| 1 | 97.293 | 6.500 | 1.90525 | 35.04 |
| 2 | 215.832 | 1.500 | | |
| 3 | 54.836 | 4.416 | 1.88300 | 40.76 |
| 4 | 79.859 | 0.400 | | |
| 5 | 34.329 | 6.788 | 1.53775 | 74.70 |
| 6 | 125.255 | 4.500 | 1.73800 | 32.33 |
| 7 | 27.129 | 5.081 | | |
| 8 | 612.768 | 10.500 | 1.53775 | 74.70 |
| 9 | −54.483 | 3.800 | 1.83400 | 37.21 |
| 10 | −136.953 | 4.193 | | |
| STO | INF | 5.549 | | |
| 12 | −55.556 | 2.000 | 1.69895 | 30.13 |
| 13 | −227.706 | 8.574 | 1.88300 | 40.76 |
| 14 | −71.687 | 0.300 | | |
| 15 | 204.756 | 1.800 | 1.56732 | 42.82 |
| 16 | 67.611 | 8.051 | 1.90525 | 35.04 |
| 17 | 142.857 | 2.133 | | |
| 18 | 627.191 | 4.192 | 1.72916 | 54.68 |
| 19 | −100.000 | 1.488 | | |
| 20 | 160.224 | 8.851 | 1.88300 | 40.76 |
| 21 | −34.561 | 2.200 | 1.60342 | 38.03 |
| 22 | 134.531 | 6.671 | | |
| 23 | −35.000 | 2.500 | 1.62004 | 36.26 |
| 24 | −134.495 | 18.200 | | |
| 25 | INF | 1.800 | 1.51680 | 64.20 |
| 26 | INF | 0.500 | | |
| 27 | INF | 0.000 | | |

TABLE 8

| f | 80.55 |
| --- | --- |
| Fno | 1.95 |
| ω | 18.93 |
| Y | 27.5 |
| Dex | −52.82 |

The first lens group 601 may have a positive refractive power. The second lens group 602 may have a positive refractive power. The third lens group 603 may have a negative refractive power. In the lens system 600, the first lens group 601, the aperture diaphragm S, and the second lens group 602 may move as a whole to perform focusing. The arrow in FIG. 7 schematically shows the trajectory of the mobile group when focusing from an infinity-distance subject to a short-distance subject.

The first lens group 601 may include a positive meniscus lens L1 with a convex surface toward the subject side, a positive meniscus lens L2 with a convex face toward the subject side, a cemented lens with a negative refractive power comprising a positive lens L3 and a negative lens L4, a cemented lens with positive refractive power comprising a positive lens L5 and a negative lens L6. With this configuration, the spherical aberration and off-axis aberration can be effectively corrected in the lens system 600 having a small F-number. In addition, by using a glass material with a large Abbe number for the third positive lens L3 and the fourth positive lens L5 from the object side, chromatic aberration on the axis and off-axis chromatic aberration can be corrected well.

The second lens group 602 may include a cemented lens with a negative refractive power comprising a negative lens L7 having a concave subject-side surface and a positive lens L8, a cemented lens with a positive refractive power comprising a negative lens L9 and a positive lens L10, and a positive lens L11 having a biconvex shape. By sharing the refractive power required for the second lens group 602 with at least four lenses, the on-axis aberration, and off-axis aberration can be corrected in a balanced manner.

The third lens group 603 may include a cemented lens with a positive refractive power comprising a positive lens L12 with a biconvex shape and a negative lens L13 with a biconcave shape, and a negative meniscus lens L14 having a convex image side surface.

Figure 8:
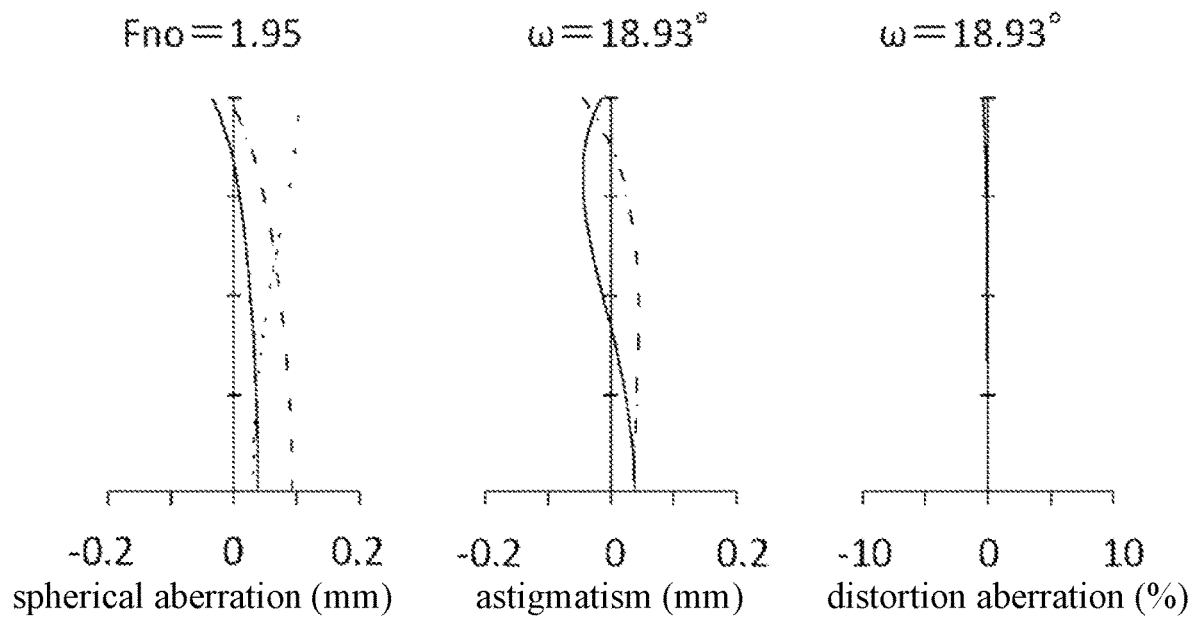
FIG. 8 illustrates a spherical aberration, astigmatism, and distortion aberration of the lens system in FIG. 7 focusing on an infinity-distance subject consistent with various embodiment of the present disclosure.

FIG. 8 shows spherical aberration, astigmatism, and distortion aberration of the lens system 700 in a state of focusing on an infinity-distance subject. In spherical aberration, the one-dot chain line indicates the value of the C-line (656.27 nm), the solid line indicates the value of the d-line (587.56 nm), and the dashed line indicates the value of the g-line (435.84 nm). In astigmatism, a solid line represents the value of the sagittal image plane of the d-line, and a dashed line represents the value of the meridional image plane of the d-line. The distortion aberration indicates the value of the d-line. As can be seen from the aberration diagrams, the lens system 600 may have a good correction of each aberration and excellent imaging performance.

Figure 9:
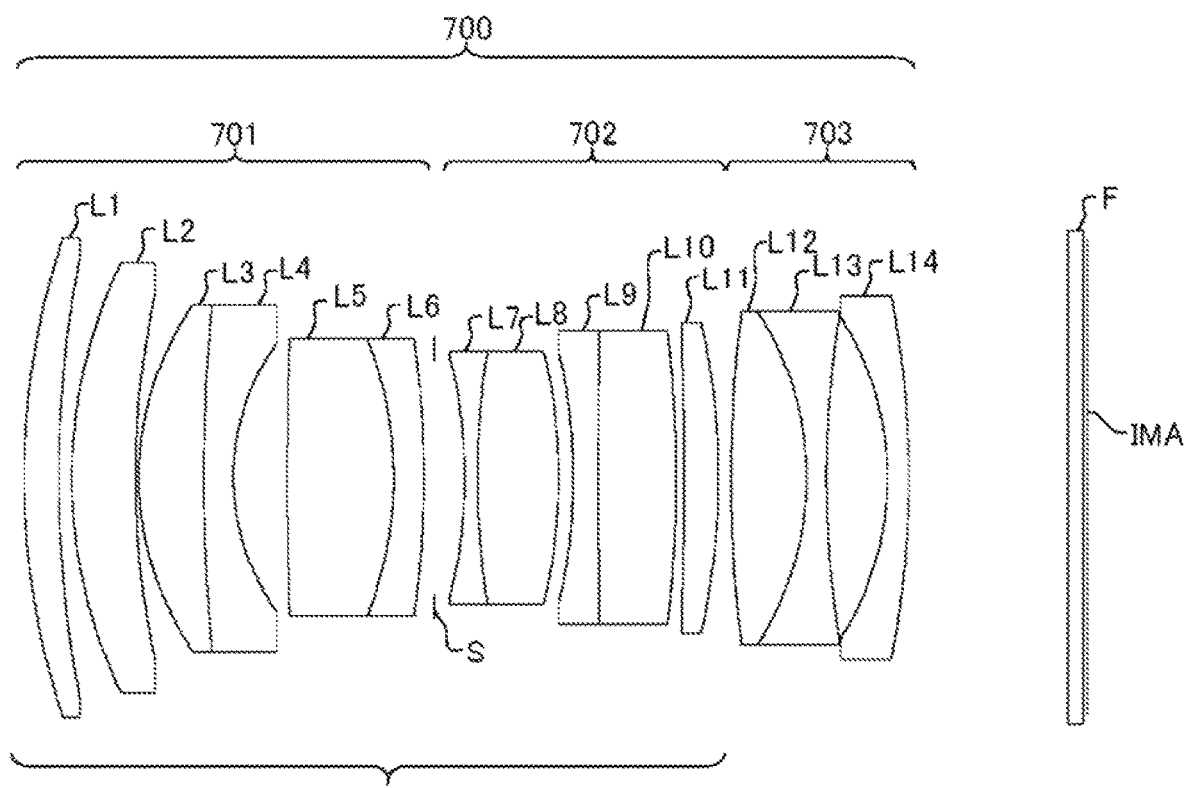
FIG. 9 illustrates a lens structure, a filter and an imaging device in another exemplary lens system consistent with various embodiment of the present disclosure.

FIG. 9 illustrates another exemplary lens system 700, a filter F and an imaging device IMA provided by another embodiment (Embodiment 5) of the present disclosure. From a subject side, the lens system 700 may include a first lens group 701, an aperture diaphragm S, a second lens group 702, and a third lens group 703, sequentially. The filter F may be disposed at a subject side of the imaging device IMA.

Table 9 illustrates parameters of lenses of the lens system 700, where Di, n, v are listed relative to the surface numbers i.

Table 10 illustrates the focal length f of the entire system, Fno, the half field angle ω, the radius of the effective image ring Y, and the exit pupil distance Dex, when the lens system 700 focuses on an infinity-distance subject.

TABLE 9

| Surface i | R | D | Nd | Vd |
|---|---|---|---|---|
| 1 | 88.641 | 4.087 | 1.90525 | 35.04 |
| 2 | 137.907 | 1.500 | | |
| 3 | 57.904 | 7.500 | 1.88300 | 40.76 |
| 4 | 102.502 | 0.400 | | |
| 5 | 36.069 | 7.571 | 1.53775 | 74.70 |
| 6 | 205.098 | 3.500 | 1.73800 | 32.33 |
| 7 | 27.383 | 6.347 | | |
| 8 | 500.000 | 12.500 | 1.53775 | 74.70 |
| 9 | −43.999 | 3.500 | 1.71700 | 47.93 |
| 10 | −117.867 | 1.214 | | |
| STO | INF | 3.605 | | |
| 12 | −56.006 | 1.500 | 1.54072 | 47.23 |
| 13 | 96.005 | 9.500 | 1.85150 | 40.78 |
| 14 | −62.793 | 1.709 | | |
| 15 | −64.876 | 3.000 | 1.69895 | 30.13 |
| 16 | 1152.249 | 9.137 | 1.88300 | 40.76 |
| 17 | −144.453 | 0.903 | | |
| 18 | −469.509 | 4.010 | 1.61800 | 63.33 |
| 19 | −84.297 | 1.488 | | |
| 20 | 148.263 | 8.841 | 1.88300 | 40.76 |
| 21 | −36.343 | 2.358 | 1.62004 | 36.26 |
| 22 | 117.961 | 7.195 | | |
| 23 | −35.000 | 2.500 | 1.54072 | 47.23 |
| 24 | −112.159 | 18.700 | | |
| 25 | INF | 1.800 | 1.51680 | 64.20 |
| 26 | INF | 0.500 | | |
| 27 | INF | 0.000 | | |

TABLE 10

| | |
|---|---|
| f | 80.54 |
| Fno | 1.85 |
| ω | 19.04 |
| Y | 27.5 |
| Dex | −55.58 |

The first lens group 701 may have a positive refractive power. The second lens group 702 may have a positive refractive power. The third lens group 703 may have a negative refractive power. In the lens system 700, the first lens group 701, the aperture diaphragm S, and the second lens group 702 may move as a whole to perform focusing. The arrow in FIG. 9 schematically shows the trajectory of the mobile group when focusing from an infinity-distance subject to a short-distance subject.

The first lens group 701 may include a positive meniscus lens L1 with a convex surface toward the subject side, a positive meniscus lens L2 with a convex face toward the subject side, a cemented lens with a negative refractive power comprising a positive lens L3 and a negative lens L4, a cemented lens with positive refractive power comprising a positive lens L5 and a negative lens L6. With this configuration, the spherical aberration and off-axis aberration can be effectively corrected in the lens system 700 having a small F-number. In addition, by using a glass material with a large Abbe number for the third positive lens L3 and the fourth positive lens L5 from the object side, chromatic aberration on the axis and off-axis chromatic aberration can be corrected well.

The second lens group 702 may include a cemented lens with a negative refractive power comprising a negative lens L7 having a biconcave subject-side surface and a positive lens L8 having a biconvex shape, a cemented lens with a positive refractive power comprising a negative lens L9 and a positive lens L10, and a positive lens L11 having a convex image side surface. By sharing the refractive power required for the second lens group 702 with at least four lenses, the on-axis aberration and off-axis aberration can be corrected in a balanced manner.

The third lens group 703 may include a cemented lens with a positive refractive power comprising a positive lens L12 with a biconvex shape and a negative lens L13 with a biconcave shape, and a negative meniscus lens L14 having a convex image side surface.

Figure 10:
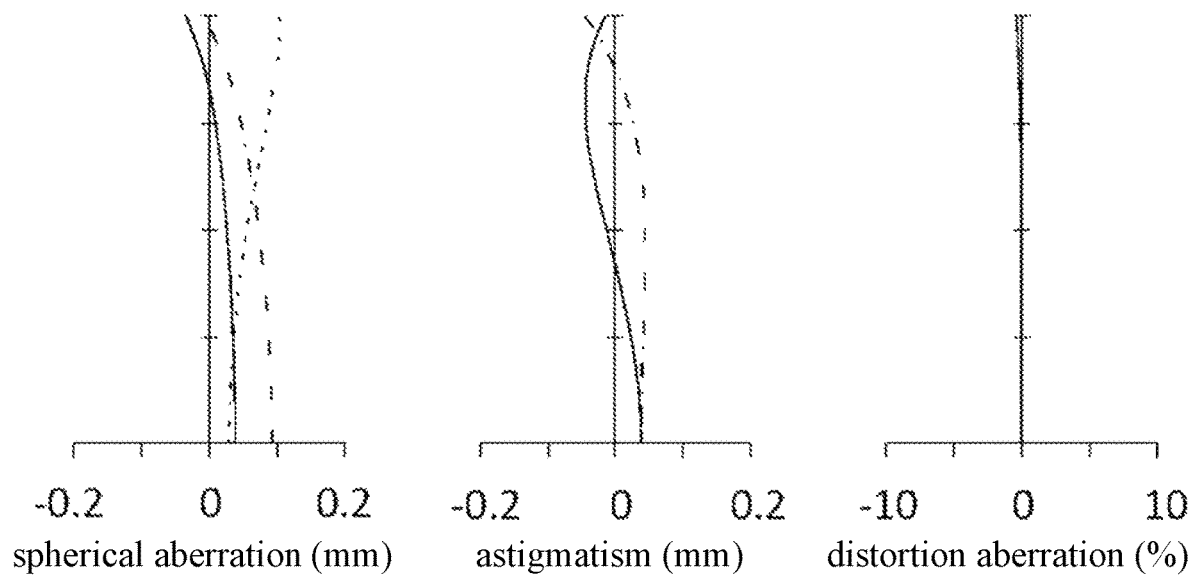
FIG. 10 illustrates a spherical aberration, astigmatism, and distortion aberration of the lens system in FIG. 8 focusing on an infinity-distance subject consistent with various embodiment of the present disclosure.

FIG. 10 shows spherical aberration, astigmatism, and distortion aberration of the lens system 700 in a state of focusing on an infinity-distance subject. In spherical aberration, the one-dot chain line indicates the value of the C-line (656.27 nm), the solid line indicates the value of the d-line (587.56 nm), and the dashed line indicates the value of the g-line (435.84 nm). In astigmatism, a solid line represents the value of the sagittal image plane of the d-line, and a dashed line represents the value of the meridional image plane of the d-line. The distortion aberration indicates the value of the d-line. As can be seen from the aberration diagrams, the lens system 700 may have a good correction of each aberration and excellent imaging performance.

Table 11 illustrates values of the above condition expressions in Embodiment 1 to Embodiment 5.

TABLE 11

| | Condition expression 1 | Condition expression 2 | Condition expression 3 | Condition expression 4 | Condition expression 5 | Condition expression 6 | Condition expression 7 |
|---|---|---|---|---|---|---|---|
| 1 | 1.73 | −0.49 | −0.60 | 4.75 | 1.046 | −16.26 | 74.70 |
| 2 | 1.73 | −0.48 | −0.57 | 14.47 | 1.079 | −12.49 | 74.70 |
| 3 | 1.52 | −0.50 | −0.76 | 7.28 | 1.060 | −2.05 | 74.70 |
| 4 | 1.42 | −0.52 | −0.69 | 4.82 | 1.045 | −1.70 | 74.70 |
| 5 | 1.28 | −0.49 | −0.70 | 8.30 | 1.069 | −1.46 | 74.70 |

Table 12 illustrates the focal length of the first lens group, the focal length of the second lens group, the focal length of the third lens group, and the combined focal length of the first length group and the second length group.

TABLE 12

| | First lens group | Second lens group | Third lens group | Combined focal length of first and second length groups |
|---|---|---|---|---|
| 1 | 151.37 | 87.71 | −379.85 | 83.61 |
| 2 | 157.63 | 91.05 | −1158.41 | 86.40 |

TABLE 12-continued

|   | First lens group | Second lens group | Third lens group | Combined focal length of first and second length groups |
|---|---|---|---|---|
| 3 | 144.56 | 94.86 | −585.78 | 85.35 |
| 4 | 137.97 | 96.98 | −388.07 | 84.19 |
| 5 | 134.69 | 105.15 | −668.74 | 86.07 |

According to the lens system provided by various embodiments of the present disclosure, a lens system with relatively large image size, a small F value, and a small overall lens system length may be achieved. For example, a small lens system with an F value of about 1.8 to about 2 and a large diameter may be achieved according to various embodiments of the present disclosure. The lens system provided by various embodiments of the present disclosure may be applied to an imaging lens system of an imaging device including a digital camera or a video camera. The lens system provided by various embodiments of the present disclosure may particularly be suitable for an imaging device having an imaging element with a medium or large size. The lens system according to the present embodiment can be applied to an imaging lens of an imaging device with a non-interchangeable lens. The lens system according to this embodiment can be applied to a replaceable lens of a lens interchangeable camera such as a single-lens reflex camera.

The present disclosure also provides a moving object. In one embodiment illustrated in FIG. 11, the moving object system 10 may include an unmanned aerial vehicle (UAV) 100 and a controller 50. The UAV 100 may include a UAV body 101, a gimbal 110, a plurality of imaging devices 230, and an imaging device 220. The imaging device 220 may include a lens device 160 and an imaging unit 140. The lens device 160 may include a lens system provided by various embodiments of the present disclosure. For description purposes only, the UAV 100 in the present embodiment is used as an example of a moving object that includes a lens system provided by various embodiments of the present disclosure and can move to illustrate the present disclosure, and should not limit the scopes of the present disclosure. In various embodiments, besides a UAV, the moving object may include another aerial vehicle that can move in the sky, a vehicle that can move on the ground, a ship moving on the water.

The UAV body 101 may include a plurality of propellers. The UAV body 101 may control the rotation of the plurality of propellers, to make the UAV 100 fly. In one embodiment, the UAV body 101 may include four propellers to make the UAV 100 fly. For description purposes only, the embodiment with the UAV body including four propellers is used as an example to illustrate the present disclosure. In other embodiments, a number of the plurality of propellers may be different from four, or the UAV 100 may be a fixed-wing aircraft with propellers.

The imaging device 220 may be a camera that photographs photographing subjects in a desired imaging range. The plurality of imaging devices 230 may be sensing cameras for imaging a periphery of the UAV 100 to control the flight of the UAV 100. The plurality of imaging devices 230 may be fixed to the UAV body 101.

In one embodiment, a number of the plurality of imaging devices 230 may be four. Two camera devices 230 of the plurality of imaging devices 230 may be installed on the front of the UAV 100. In addition, the other two camera devices 230 of the plurality of imaging devices 230 may be disposed on the bottom surface of the UAV 100. The two imaging devices 230 on the front side may be paired and can be used as a so-called stereo camera. The two imaging devices 230 on the bottom surface side may be also paired and can also be used as a stereo camera. From images captured by the plurality of imaging devices 230, three-dimensional spatial data around the UAV 100 can be generated. A distance to a subject imaged by the plurality of imaging devices 230 may be determined by a stereo camera formed by the plurality of imaging devices 230.

For description purposes only, the UAV 100 with four imaging devices 230 is used as an example to illustrate the present disclosure and should not limit the scopes of the present disclosure. In various embodiments, UAV 100 may include at least one imaging device 230 and a number of the imaging devices 230 may be different from four. In one embodiment, the UAV 100 may include at least one imaging device 230 on each of a vehicle head, a tail, a side, a bottom, and a top of the UAV 100. Each of the plurality of imaging devices 230 may include a single focus lens or a fisheye lens. In the description of the UAV 100, the plurality of imaging devices 230 may be referred to as the imaging device 230 as a whole.

The controller 50 may include a display unit 54 and an operation unit 52. The operation unit 52 may accept an input operation for controlling the posture of the UAV 100 from a user. The controller 50 may transmit a signal for controlling the UAV 100 according to the user operation accepted by the operation unit 52. For example, the operation unit 52 may accept an operation of changing the focus distance of the lens device 160, and the controller 50 may send a signal to the UAV 100 indicating a change in the focus state.

The controller 50 may receive an image at least in one direction captured by the plurality of imaging devices 230 and the imaging device 220. The display unit 54 may display the image received by the controller 50. The display unit 54 may be a touch panel. The controller 50 can accept an input operation from a user through the display unit 54. The display unit 54 may accept a user operation that specifies the position of a subject to be imaged by the imaging device 220 by the user.

The imaging unit 140 may generate and record image data of an optical image formed by the lens device 160. The lens device 160 may be provided integrally with the imaging unit 140. The lens device 160 may be a so-called interchangeable lens. The lens device 160 may be detachably provided in the imaging unit 140.

The gimbal 110 may be a supporting mechanism capable of movably supporting the imaging device 220. The imaging device 220 may be mounted to the UAV body 101 via the gimbal 110. The gimbal 110 may rotatably support the imaging device 220 around a pitch axis and may rotatably support the imaging device 220 around a roll axis. The gimbal 110 may support the imaging device 220 rotatably around a yaw axis. The gimbal 110 may rotatably support the imaging device 220 around at least one of the pitch axis, the roll axis, and the yaw axis. The gimbal 110 may rotatably support the imaging device 220 around a pitch axis, a roll axis, and a yaw axis, respectively. The gimbal 110 may hold the imaging unit 140 or the lens device 160. The gimbal 110 may change the imaging direction of the imaging device 220 by rotating the imaging unit 140 and the lens device 160 around at least one of the yaw axis, the pitch axis, and the roll axis.

Figure 11:
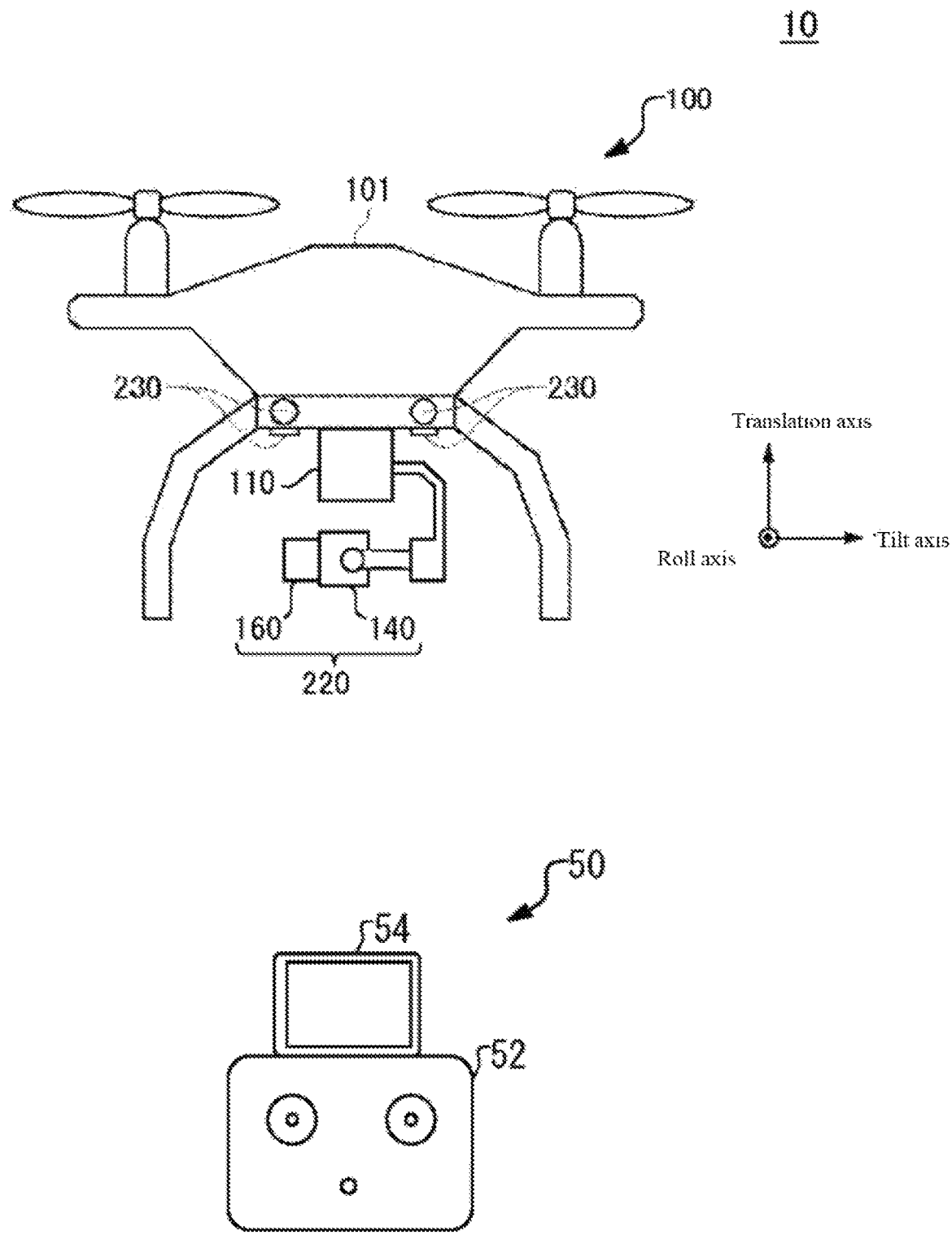
FIG. 11 illustrates an exemplary moving object including an unmanned aerial vehicle and a controller consistent with various embodiment of the present disclosure.
Figure 12:
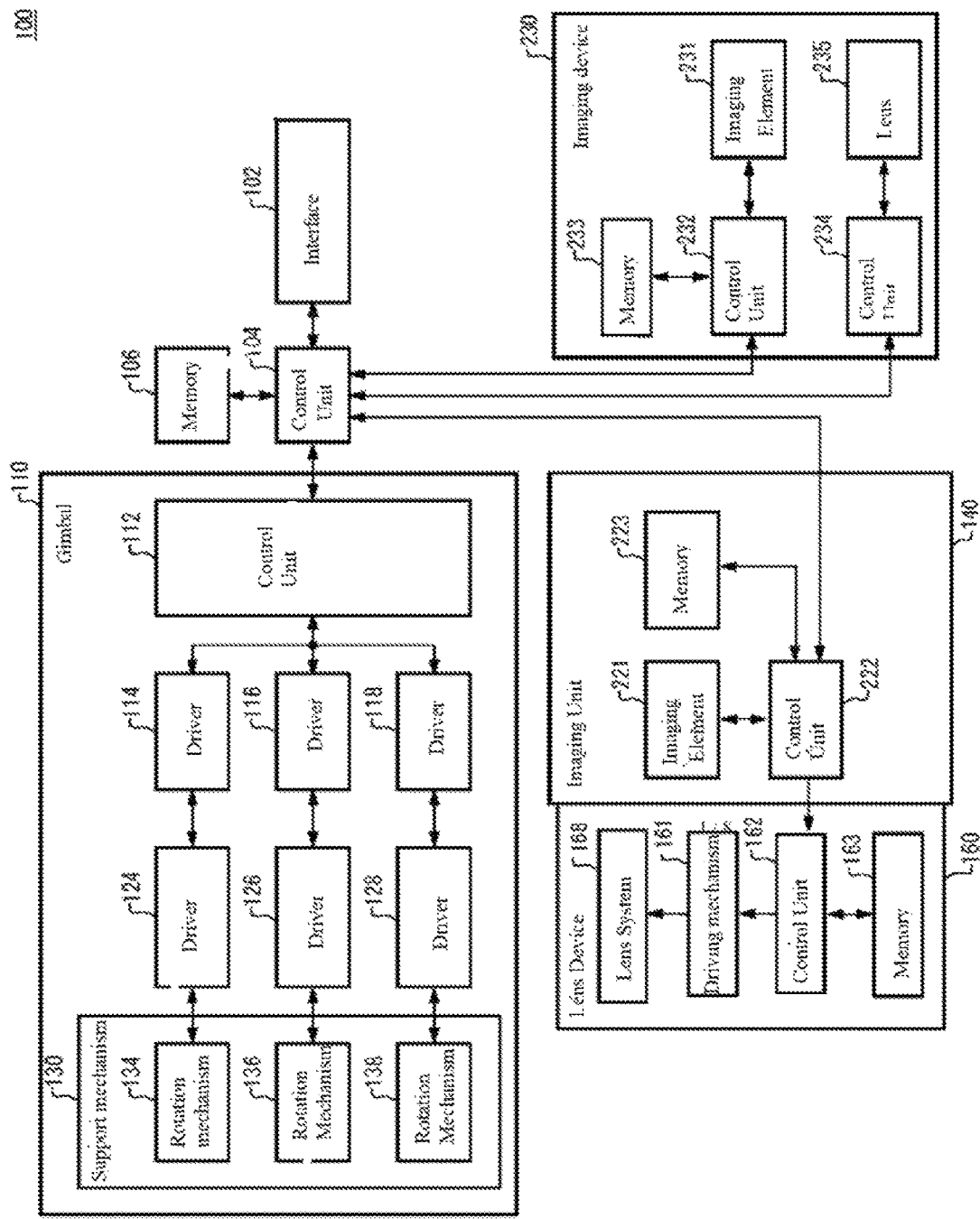
FIG. 12 illustrates an exemplary unmanned aerial vehicle in FIG. 11 consistent with various embodiment of the present disclosure.

FIG. 12 illustrates an exemplary UAV 100 in the moving object system illustrated in FIG. 11 consistent with various embodiments of the present disclosure. The UAV 100 may include an interface 102, a control unit 104, a memory 106, a gimbal 110, an imaging unit 140, and a lens device 160.

The interface 102 may communicate with the controller 50. The interface 102 may receive various instructions from the controller 50. The control unit 104 may control the flight of the UAV 100 according to an instruction received from the controller 50. The control unit 104 may also control the gimbal 110, the imaging unit 140, and the lens device 160. The control unit 104 may be including a microprocessor such as a CPU or an MPU, or a microcontroller such as an MCU. The memory 106 may store necessary programs for the control unit 104 to control the gimbal 110, the imaging unit 140, and the lens device 160.

The memory 106 may be a computer-readable recording medium. The memory 106 may include at least one of flash memories such as SRAM, DRAM, EPROM, EEPROM, and USB memory. The memory 106 may be provided in a housing of the UAV 100. In some other embodiments, the memory 106 can also be detachable from the housing of the UAV 100.

The gimbal 110 may include a control unit 112, a driver 114, a driver 116, a driver 118, a driving unit 124, a driving unit 126, a driving unit 128, and a support mechanism 130. The driving unit 124, the driving unit 126, and the driving unit 128 may be motors.

The support mechanism 130 may support the imaging device 220. The supporting mechanism 130 can movably support the imaging direction of the imaging device 220. The support mechanism 130 may rotatably support the imaging unit 140 and the lens device 160 around a yaw axis, a pitch axis, and a roll axis. The support mechanism 130 may include a rotation mechanism 134, a rotation mechanism 136, and a rotation mechanism 138. The rotation mechanism 134 may use the driving unit 124 to rotate the imaging unit 140 and the lens device 160 around the yaw axis. The rotation mechanism 136 may use the driving unit 126 to rotate the imaging unit 140 and the lens device 160 about the pitch axis. The rotation mechanism 138 may use the driving unit 128 to rotate the imaging unit 140 and the lens device 160 around a roll axis.

The control unit 112 may output, to the driver 114, the driver 116, and the driver 118, an operation command that instructs each of the rotation angles based on the operation command of the gimbal 110 from the control unit 104. The driver 114, the driver 116, and the driver 118 may drive the driving unit 124, the driving unit 126, and the driving unit 128 according to the operation instruction indicating the rotation angles. The rotation mechanism 134, the rotation mechanism 136, and the rotation mechanism 138 may be driven to rotate by the driving unit 124, the driving unit 126, and the driving unit 128, respectively, and change the postures of the imaging unit 140 and the lens device 160.

The imaging unit 140 may perform imaging by light passing through the lens system 168. The imaging unit 140 may include a control unit 222, an imaging element 221, and a memory 223. The control unit 222 may include a microprocessor such as a CPU or an MPU, and a microcontroller such as an MCU. The control unit 222 may control the imaging unit 140 and the lens device 160 based on an operation instruction for the imaging unit 140 and the lens device 160 from the control unit 104. The control unit 222 may output a control instruction to the lens device 160, to instruct the lens device 160 to move to the focus position, based on a signal received from the controller 50.

The memory 223 may be a computer-readable recording medium, and may include at least one of flash memories such as an SRAM, a DRAM, an EPROM, an EEPROM, or a USB memory. The memory 223 may be provided inside the housing of the imaging unit 140, and may be configured to be detachable from the housing of the imaging unit 140.

The imaging element 221 may be kept inside the housing of the imaging unit 140, and may generate image data of an optical image formed through the lens device 160, and output the image data to the control unit 222. The control unit 222 may store the image data from the imaging element 221 into the memory 223. In other embodiments, the control unit 222 may output and store the image data to the memory 106 via the control unit 104.

The lens device 160 may include a control unit 162, a memory 163, a driving mechanism 161, and a lens system 168. A lens system provided by various embodiments of the present disclosure can be used as the lens system 168.

The control unit 162 may shift the focusing lens group in the lens system 168 along the optical axis according to a control instruction from the control unit 222, to perform focus adjustment. The focusing lens group may correspond to the first lens group and the second lens group. An image formed by the lens system 168 of the lens device 160 may be captured by the imaging unit 140.

The driving mechanism 161 may shift the focusing lens group in the lens system 168. In one embodiment, the drive mechanism 161 may include an actuator and a holding unit that holds the focus lens group. A drive pulse may be supplied from the control unit 162 to the actuator. The actuator may be shifted by a driving amount corresponding to the supplied pulse. The holding unit may be shift according to the displacement of the actuator, to shift the focus lens. Thereby, the focus adjustment may be performed. In the imaging device 220, magnified photography may be performed by a so-called electronic zoom. For example, magnified photography is performed by cutting out a part of an image captured by the imaging element 221.

The lens device 160 may be provided integrally with the imaging unit 140. The lens device 160 may be a so-called interchangeable lens. The lens device 160 may be configured to be detachable from the imaging unit 140.

Each imaging device 230 of the plurality of imaging devices 230 may include a control unit 232, a control unit 234, an imaging element 231, a memory 233, and a lens 235. The control unit 232 may be including a microprocessor such as a CPU or an MPU, or a microcontroller such as an MCU. The control unit 232 may control the imaging element 231 based on an operation instruction for the imaging element 231 from the control unit 104. The control unit 234 may be including a microprocessor such as a CPU or an MPU, or a microcontroller such as an MCU. The control unit 234 may control the focus of the lens 235 based on an operation instruction for the lens 235. The control unit 234 may control the aperture diaphragm in the lens 235 according to an operation instruction for the lens 235. The memory 233 may be a computer-readable recording medium. The memory 233 may include at least one of flash memories such as an SRAM, a DRAM, an EPROM, an EEPROM, or a USB memory.

The imaging element 231 may generate image data of an optical image formed through the lens 235 and output the image data to the control unit 232. The control unit 232 may store the image data from the imaging element 231 into the memory 223.

In the present disclosure, the UAV 100 may include the control unit 104, the control unit 112, the control unit 222, the control unit 232, the control unit 234, and the control unit 162. The processing executed by the control unit 104, the control unit 112, the control unit 222, the control unit 232, the control unit 234, and the control unit 162 may be executed by any one of the control units. The processing performed by the control unit 104, the control unit 112, the control unit 222, the control unit 232, the control unit 234, and the control unit 162 may be performed by one control unit. In this embodiment, the UAV 100 includes the memory 106, the memory 223, and the memory 233. The information stored in at least one of the memory 106, the memory 223, and the memory 233 may be stored in the other one or more of the memory 106, the memory 223, and the memory 233.

Figure 13:
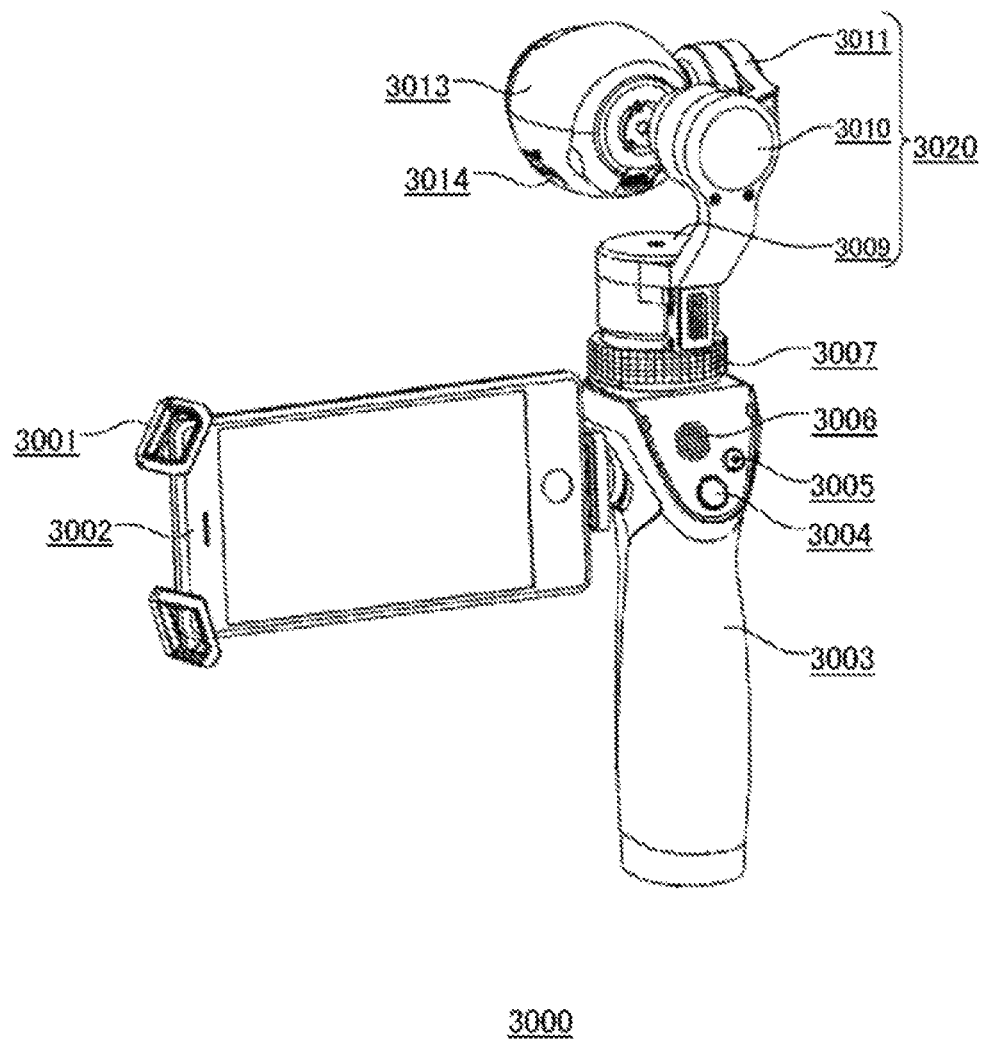
FIG. 13 illustrates an exemplary stabilizer consistent with various embodiments of the present disclosure.

The present disclosure also provides a stabilizer as a moving object. As illustrated in FIG. 13, in one embodiment, the stabilizer 3000 may include a camera unit 3013 having a same configuration as the imaging device 220. The camera unit 3013 may include a lens device having a same structure as the lens device 160.

The stabilizer 3000 may include a camera unit 3013, a gimbal 3020, and a hand-held portion 3003. The gimbal 3020 may rotatably support the camera unit 3013. The gimbal 3020 may include a translation axis 3009, a roll axis 3010, and a tilt axis 3011. The gimbal 3020 may rotatably support the camera unit 3013 around a translation axis 3009, a roll axis 3010, and a tilt axis 3011. The gimbal 3020 is an example of a support mechanism.

The camera unit 3013 is an example of an imaging device. The camera unit 3013 may include a slot 3014 for inserting a memory. The gimbal 3020 may be fixed to the handheld portion 3003 via a bracket 3007.

The hand-held portion 3003 may include various buttons for operating the gimbal 3020 and the camera unit 3013. The hand-held portion 3003 may include a shutter button 3004, a recording button 3005, and an operation button 3006. By pressing the shutter button 3004, a still image can be recorded by the camera unit 3013. By pressing the recording button 3005, a video image can be recorded by the camera unit 3013.

A device bracket 3001 may be fixed to the handheld portion 3003. The device bracket 3001 may hold a mobile device 3002 such as a smartphone. The mobile device 3002 may be communicably connected to the stabilizer 3000 via a wireless network such as WiFi. Therefore, the image captured by the camera unit 3013 can be displayed on the screen of the mobile device 3002.

In the stabilizer 3000, the camera unit 3013 may include a lens system provided by various embodiments of the present disclosure, and can obtain a large and bright image. In addition, the camera unit 3013 can be miniaturized.

The UAV 100 and the stabilizer 3000 have been described above as examples of a moving object consistent with various embodiments of the present disclosure, and should not limit the scopes of the present disclosure. In various embodiments of the present disclosure, any suitable imaging device having a same structure as the imaging device 220 can be mounted on any suitable mobile objects other than the UAV 100 and the stabilizer 3000.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of example systems, devices, and units may be omitted and references can be made to the descriptions of the example methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A lens system for using with an image sensor, comprising:
   a first lens group being a positive lens group, an aperture diaphragm, a second lens group being a positive lens group, and a third lens group, disposed sequentially from a subject side, wherein:
   the first lens group includes four or more lenses, including at least three positive lenses and at least one negative lens;
   the second lens group includes four or more lenses, including at least one cemented lens, wherein a negative lens with a concave surface toward the subject side is disposed at the subject side;
   the third lens group includes three or more lenses, including at least one positive lens and at least one negative lens;
   when focusing is moving from an infinity-distance subject to a short-distance subject, the first lens group, the aperture diaphragm, and the second lens group move integrally toward the subject side, and the third lens group is fixed with respect to an image surface; and for a focal length f1 of the first lens group, a focal length f2 of the second lens group, an exit pupil distance Dex of the lens system when focusing on an infinity-distance subject, and a radius Y of an effective image ring of the lens system when focusing on an infinity-distance subject, 1.1<f1/f2<1.85 and −0.65<Y/Dex<−0.33, the exit pupil distance of the lens system being a distance from the image surface to an exit pupil, and the effective image ring of the lens system being a circle covering a diagonal length of the image sensor.

2. The system according to claim 1, wherein:
for a curvature radius R2f of a surface of the second lens group closest to the subject side and a focal length f of an entire system, −0.95<R2f/f<−0.38.

3. The system according to claim 1, wherein a focal length f3 of the third lens group and a focal length f of an entire system satisfy 1.0<|f3/f|.

4. The system according to claim 3, wherein a combined focal length f12 of the first lens group and the second lens group satisfies 0.85<f12/f<1.2.

5. The system according to claim 1, wherein:
a curvature radius R1f of a surface of the first lens group closest to an image side and a focal length f of an entire system satisfy R1f/f<−0.3.

6. An imaging apparatus, comprising:
a lens system for using with an imaging sensor, and an imaging component, wherein:
  the lens system includes a first lens group being a positive lens group, an aperture diaphragm, a second lens group being a positive lens group, and a third lens group, disposed sequentially from a subject side;
  the first lens group includes four or more lenses, including at least three positive lenses and at least one negative lens;
the second lens group includes four or more lenses, including at least one cemented lens, wherein a negative lens with a concave surface toward the subject side is disposed at the subject side;
the third lens group includes three or more lenses, including at least one positive lens and at least one negative lens;
when focusing is moving from an infinity-distance subject to a short-distance subject, the first lens group, the aperture diaphragm, and the second lens group move integrally toward the subject side, while the third lens group is fixed with respect to an image surface; and
for a focal length f1 of the first lens group, a focal length f2 of the second lens group, an exit pupil distance Dex of the lens system when focusing on an infinity-distance subject, and a radius Y of an effective image ring of the lens system when focusing on an infinity-distance subject, 1.1<f1/f2<1.85 and −0.65<Y/Dex<−0.33, the exit pupil distance of the lens system being a distance from the image surface to an exit pupil, and the effective image ring of the lens system being a circle covering a diagonal length of the image sensor.

7. The apparatus according to claim 6, wherein:
for a curvature radius R2f of a surface of the second lens group closest to the subject side and a focal length f of an entire system, −0.95<R2f/f<−0.38.

8. The apparatus according to claim 6, wherein a focal length f3 of the third lens group and a focal length f of an entire system satisfy 1.0<|f3/f|.

9. The apparatus according to claim 8, wherein a combined focal length f12 of the first lens group and the second lens group satisfies 0.85<f12/f<1.2.

10. The apparatus according to claim 6, wherein:
a curvature radius R1f of a surface of the first lens group closest to an image side and a focal length f of an entire system satisfy R1f/f<−0.3.

11. The apparatus according to claim 6, wherein the imaging apparatus is supported by a stabilizer.

12. A moving object that is movable, comprising:
a lens system for using with an imaging sensor, including:
  a first lens group being a positive lens group, an aperture diaphragm, a second lens group being a positive lens group, and a third lens group, disposed sequentially from a subject side, wherein:
  the first lens group includes four or more lenses, including at least three positive lenses and at least one negative lens;
  the second lens group includes four or more lenses, including at least one cemented lens, wherein a negative lens with a concave surface toward the subject side is disposed at the subject side;
  the third lens group includes three or more lenses, including at least one positive lens and at least one negative lens;
  when focusing is moving from an infinity-distance subject to a short-distance subject, the first lens group, the aperture diaphragm, and the second lens group move integrally toward the subject side, and the third lens group is fixed with respect to an image surface; and
  for a focal length f1 of the first lens group, a focal length f2 of the second lens group, an exit pupil distance Dex of the lens system when focusing on an infinity-distance subject, and a radius Y of an effective image ring of the lens system when focusing on an infinity-distance subject, 1.1<f1/f2<1.85 and −0.65<Y/Dex<−0.33, the exit pupil distance of the lens system being a distance from the image surface to an exit pupil, and the effective image ring of the lens system being a circle covering a diagonal length of the image sensor.

13. The object according to claim 12, wherein:
for a curvature radius R2f of a surface of the second lens group closest to the subject side and a focal length f of an entire system, −0.95<R2f/f<−0.38.

14. The object according to claim 12, wherein a focal length f3 of the third lens group and a focal length f of an entire system satisfy 1.0<|f3/f|.

15. The object according to claim 14, wherein a combined focal length f12 of the first lens group and the second lens group satisfies 0.85<f12/f<1.2.

16. The object according to claim 14, wherein:
a curvature radius R1f of a surface of the first lens group closest to an image side and a focal length f of an entire system satisfy R1f/f<−0.3.

17. The moving object according to claim 12, wherein the moving object is an unmanned aerial vehicle.

* * * * *